United States Patent [19]
Hingley

[11] 3,829,183
[45] Aug. 13, 1974

[54] ULTRA HIGH SPEED ROLLING BEARING ASSEMBLY

[75] Inventor: Colin G. Hingley, Strafford-Wayne, Pa.

[73] Assignee: SKF Industries, Inc., King of Prussia, Pa.

[22] Filed: Jan. 17, 1973

[21] Appl. No.: 324,443

[52] U.S. Cl. .............................. 308/213
[51] Int. Cl. ............................. F16c 33/00
[58] Field of Search ............ 308/213, 200, 196, 215

[56] References Cited
UNITED STATES PATENTS

| | | | |
|---|---|---|---|
| 1,773,461 | 8/1930 | Killian | 308/206 |
| 1,982,893 | 12/1934 | Wilson | 308/206 |
| 2,221,513 | 11/1940 | Foley | 308/206 |

FOREIGN PATENTS OR APPLICATIONS

| | | | |
|---|---|---|---|
| 991,607 | 6/1957 | France | 308/200 |

Primary Examiner—Charles J. Myhre
Assistant Examiner—Frank Susko
Attorney, Agent, or Firm—Howson and Howson; Eugene E. Renz, Jr.

[57] ABSTRACT

A roller bearing assembly comprising inner and outer rings having confronting spaced apart raceways defining an annular space, a plurality of rolling elements in the annular space between said rings, said rolling elements and raceways being of a predetermined configuration providing for rotation of each of the rolling elements about a fixed axis and having a substantially fixed contact angle, said rolling elements being in line contact with the outer raceway and engaging axially spaced sections of the inner raceway and spaced from the inner ring surface between the inner raceway sections.

11 Claims, 7 Drawing Figures

FIG.5.
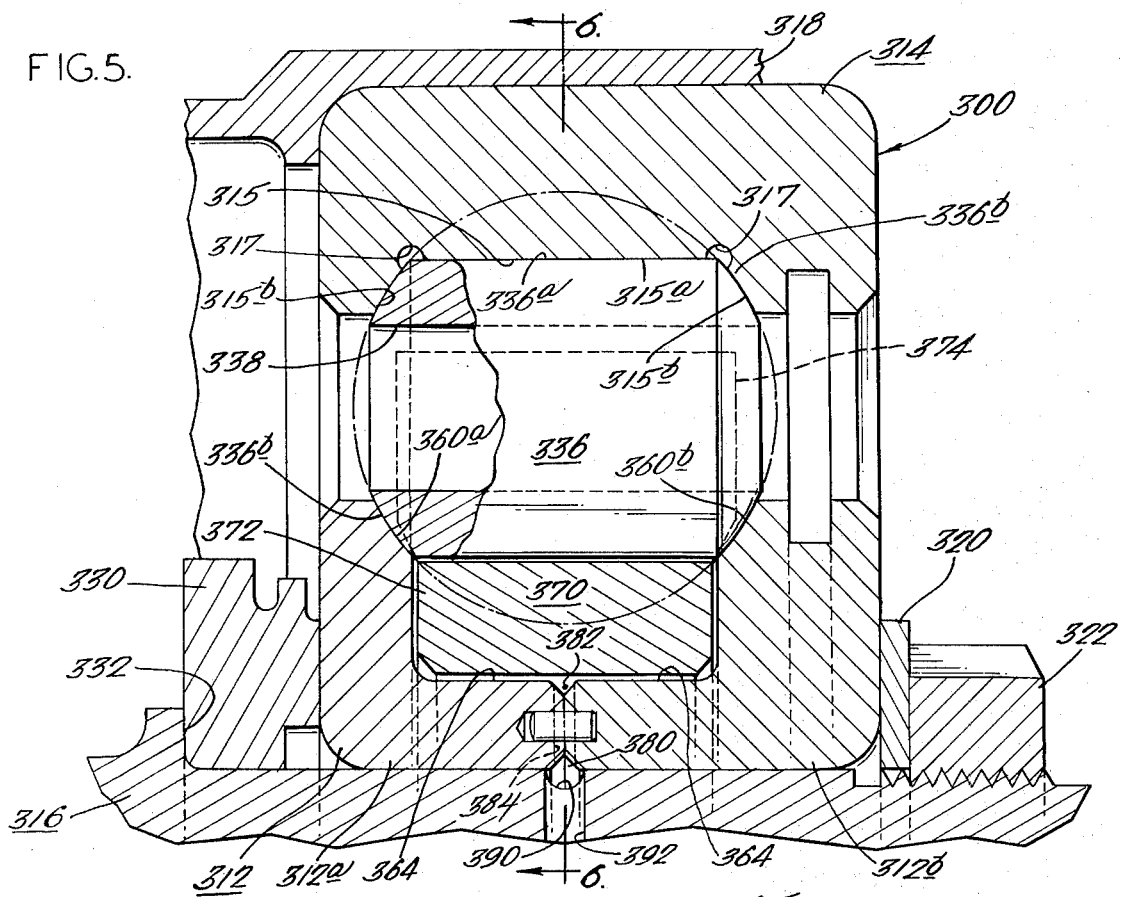
FIG.6.
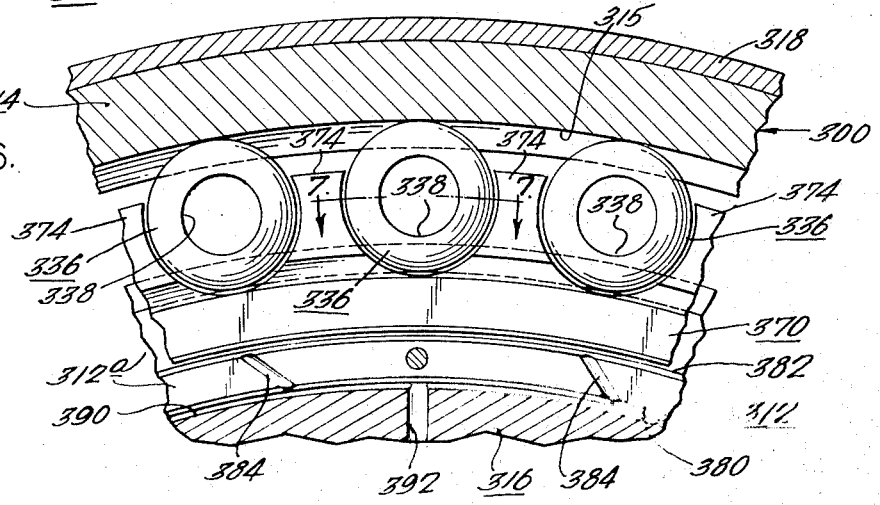
FIG.7.

ULTRA HIGH SPEED ROLLING BEARING ASSEMBLY

The present invention relates to bearing assemblies and more particularly to a new and improved bearing assembly especially adapted for use in ultra high speed applications; for example, as the main shaft thrust bearing in jet engines.

Current bearing designs function generally satisfactorily in current engine designs. However future jet engine designs contemplate and demand much greater power to weight ratios and power to size ratios. The result, therefore, is toward larger mainshaft diameters running at even greater speeds than present engines. In these engines, there will be a higher orbital speed of the rolling elements of the bearing assembly which in present bearing designs would cause severe centrifugal stressing of the outer ring contacts and consequent gross reduction in contact fatigue life.

In these new engine applications, the optimum bearing assembly is one which takes up a minimum amount of space, is of comparatively light weight, and one which has good radial, thrust and centrifugal load carrying capabilities over a comparatively long period of use.

Various types of conventional rolling bearing assemblies now being used will not be suitable in these new ultra high speed turbine engine applications for various reasons. Current engines generally employ a singel row high-land ball bearing to journal the shaft at one point, and to absorb both forward and reverse thrust forces from the shaft caused by the dynamics of the engine operation. A cylindrical roller bearing journals the shaft at the other extremity.

In some designs, a duplexed pair of ball thrust bearings must be employed to provide sufficient capacity to absorb the thrust. It has been found that conventional angular contact ball bearings of a size to accommodate radial and thrust loads in ultra high speed applications exhibit short life and failure since they do not endure high centrifugal loading. More specifically, high centrifugal forces produce undesirable shifts in the contact angle and the axis of rotation of the ball elements. The shifting contact angle and axis of rotation phenomenon also increase spinning heat and result in gyro instability, thereby reducing the life of the bearing. Gyro effects lead to severe skidding of the ball which can lead to smearing type surface failures rather than fatigue type failures.

There is a growing demand for greater thrust and thrust-to-weight ratios and also thrust-to-size ratio engines which call for the development of engines having much greater air throughputs. Mainshaft diameters and speeds must be increased considerably, both of which place severe demands on the bearings. As bearing size and speed is increased, centrifugal forces, developed by the orbiting rolling elements, produce extremely high stress levels at the nominally point contact areas at the outer rings whereby in extreme conditions the calculated lives of outer rings is reduced to the order of minutes.

Thrust loads are also likely to increase and thus a need has been created for a bearing having extreme speed capabilities without sacrifice in the basic dual-directional thrust carrying capacity of the present ball bearing.

Taper roller bearings are acknowledged for their inherent high thrust carrying capacity, by virtue of their conic design with the major loads being transmitted between the elements through nominal line contacts. The normal taper bearing has the disadvantage of being able to carry significant thrust in only one direction. Two, arranged back-to-back or face-to-face are needed to cope with dual directional thrust. This presents a penalty in terms of space, weight, cost and reliability. At the very high speeds being called for, the internal conic geometry of a taper roller bearing causes internal parasitic thrust forces to be developed, which unless suitably compensated can cause the bearing to fly apart or declutch Pairs of taper bearings are thus again needed to overcome these internal forces, and their mutual interaction detracts from their capacity to carry external thrust forces.

Taper roller bearings have been proposed, which incorporate a flange, contacting the large end of the rollers, located on the outer ring, and a smaller roller end flange located on the inner ring. By this arrangement, a single taper roller bearing can absorb thrusts in either direction. These bearings, however, have a very limited capacity in the "reverse" direction. These bearing assemblies have the advantage of overcoming their own declutching tendencies and thereby a much simpler engine rotor assembly could be constructed with this bearing, space conservation being an important criterion in turbine engine design.

Conventional cylindrical roller bearings, through improvement in roller end to flange contact geometry, have been developed to have some limited thrust carrying capacity, even at high speeds. At high thrust loads, a canting moment is developed on each roller, disturbing the nominal line contact with both the inner and outer raceways. Further, for high speed these bearings must be provided with ample internal radial clearance. This clearance permits excessive canting resulting from the force couples on each roller to cause serious edge loading of the raceway contacts with attendant serious reduction in fatigue life. This internal clearance also reduces the accuracy of shaft journaling and also prevents uniform distribution of the thrust loads throughout the roller complement with the result that the load is carried by only a portion of the rollers and not the full complement.

The present invention achieves a combination of the best properties of ball, roller, and taper bearings, as they pertain to high-speed thrust-carrying applications.

In accordance with the present invention, there is provided a roller bearing assembly having optimum capabilities in ultra high speed applications, which is especially adapted for use in turbine engine shaft applications. The rolling bearing of the present invention combines in one assembly the optimum functional features of ball and roller bearings.

In high speed applications, there comes a point of speed beyond which the ultimate line contact bearing is no longer a taper. At speeds of this magnitude, the generated centrifugal force is much larger than the applied thrust load to be carried. Thus, it is desirable to reduce the primary contact angle toward O, for example, and utilize a cylindrical roller bearing.

This, however, poses some problem as to the carrying of the thrust load. The bearing of the present invention provides the most practical solution to this problem wherein a cylindrical outer ring roller contact carries the centrifugal force and an angular contact "ball" configuration carries the thrust load. This configuration may, therefore, be termed a "roll-ball" type bearing.

In accordance with the present invention, the rolling elements are of generally cylindrical configuration, having arcuate end portions and the outer ring is provided with a raceway conforming to the contour of the rolling element, and the inner ring assembly has arcuate end raceway sections conforming to the end of portions of the rolling elements and axially spaced apart and a central section between the raceway sections which is spaced from the cylindrical portion of the rolling elements.

In this assembly, the optimum functional capabilities are achieved in that the centrifugal force is reduced and the remainder is supported by line contact surfaces. This force is reduced due to a reduction in rolling element mass in comparison to an equivalent ball size, the mass reduction being as much as 50 percent. In the bearing in accordance with the present invention, the axis of rotation of the rolling elements is defined, thereby spreading spin friction equally between two race contacts.

Further, in a bearing assembly of the present invention, external thrust load is carried by rolling-spinning contacts at fixed contact angles, leaving the rolling elements in force balance. The bearing assembly of the present invention requires only a single row of elements, thereby providing for a large capacity in a comparatively small space. This is an important design criterion, particularly in turbine engine shaft applications. In a single row bearing, external thrust load can be accommodated in either direction and passed through zero.

In accordance with the present invention, the bearing assembly may be designed with a very high contact angle, for example, in the range of 40° to 50°. By virtue of the high contact angle, the application of high thrust loads causes the inner ring to center precisely on the rolling elements. External thrust load is thus distributed equitably over all the rolling elements even in the presence of moderate radial loads or none at all. Maximum useful thrust capacity is thus retained under either direction of applied thrust.

Cylindrical roller bearings can only support useful thrust load through rollers which are radially loaded by either external forces or substantial centrifugal forces. Even so, the lack of self-centering of the inner ring prevents optimal utilization of the available limited thrust capacity.

The tapered roller bearing shares this ability to equitably share the thrust loads between the rollers under zero to moderate radial loads, when the thrust direction is such as to force the inner ring cone into the bearing. When the thrust direction is reversed so that the second and third auxiliary flanges are forced to carry the thrust, radial clearance develops between the conic line-contact surfaces, and roller canting, with its deleterious life effects, as in the cylindrical roller bearing is inevitable.

An important feature of the present invention is the spacing of the rolling elements from a portion of the inner ring surface between the axially spaced inner raceway sections. This facilitates use of a cage in a channel on the inner sing between the axial ends of the rolling elements, the cage having radially outwardly projecting tongues which are circumferentially spaced and shaped to afford maximum guidance for the rolling elements. This affords better lubrication of the entire assembly and permits the entire assembly to be made more compactly in an axial direction particularly. It also obviates the lubrication problem caused by conventional cages having side rail portions at the axial ends of the rollers which at high speed creates windage repelling lubricant fed by jets. There are also further functional advantages such as better guidance, increased rolling element capacity, and others explained in more detail hereafter.

In view of the above, it is clear that the bearing of the present invention overcomes the various functional problems encountered with prior conventional bearings when used in ultra high speed applications. In the bearing of the present invention, the rotational axis and contact angle are fixed thereby eliminating the problem of gyro instability, reducing fatigue at outer ring, reducing spin sliding and rolling friction, and providing a greater line contact with the outer ring thereby reducing the effect of high centrifugal loading. Further, in the bearing of the present invention, a major portion of the inner ring surface confronting the rolling elements between the raceway sections is spaced from the rolling elements thereby further reducing spin, sliding and rolling friction.

Since the axis of rotation of the rolling elements is fixed, the rolling elements may be provided with an axial opening extending the length of the element to further reduce the effect of centrifugal load, and also permit increasing the line contact area of the rolling elements with the outer ring raceway by improved element compliance. It has also been found that a greater number of rolling elements than in a dimensionally equivalent conventional bearing may be employed and thus increase capacity.

These and other objects of the present invention and various features and details of the construction and arrangement thereof are hereinafter more fully set forth with reference to the accompanying drawings, in which:

FIG. 5 is a side elevational view in section of another embodiment of rolling bearing assembly in accordance with the present invention;

FIG. 6 is a sectional view taken on lines 6—6 of FIG. 5; and

FIG. 7 is a sectional view taken on lines 7—7 of FIG. 6.

Figure 1:
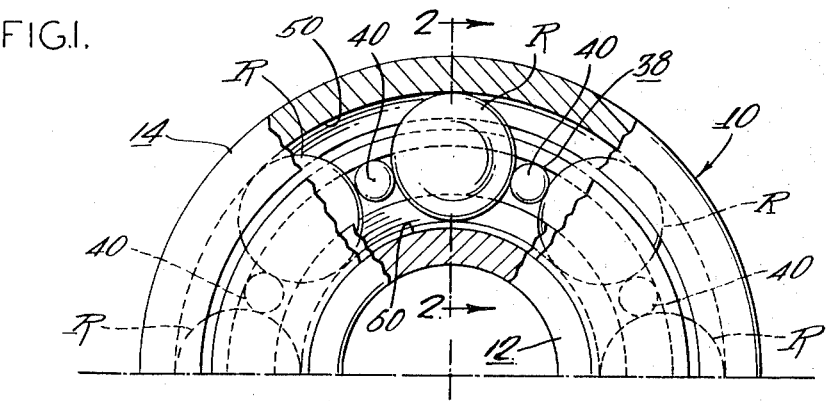
FIG. 1 is a fragmentary side elevational view partly in section of a rolling bearing assembly in accordance with the present invention.
Figure 2:
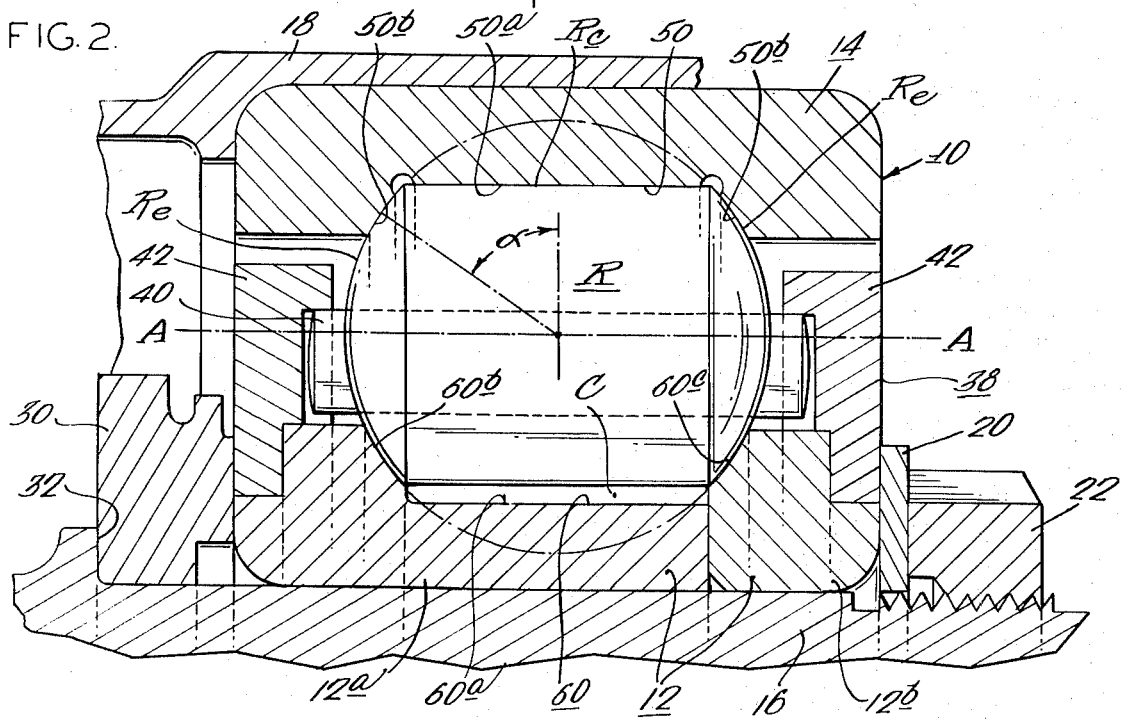
FIG. 2 is an enlarged sectional view taken along lines 2—2 of FIG. 1.

Referring now to the drawing, there is illustrated a roller bearing assembly generally designated by the numeral 10 constructed in accordance with the present invention This bearing assembly is adapted for ultra high speed applications and, as illustrated in FIG. 2, the bearing is shown mounted in a typical jet engine main shaft assembly.

The bearing basically comprises inner and outer rings 12 and 14, respectively, the inner ring being supported on the hub portion 16 of the main shaft and the outer ring 14 being supported in a housing 18. The inner ring assembly in the present instance includes two ring members, 12a and 12b, which are fixed against axial displacement and supported in the housing at one end by a spacer 20 and a lock nut arrangement 22 and at the opposite end between a spacer 30 which is pressed against a peripheral shoulder 32 on the hub 16.

The bearing assembly 10 further includes a plurality of rolling elements R in the annular space between the inner and outer rings, a cage assembly 38 for circumferentially spacing the rolling elements, comprising as illustrated needle roller type spacing elements 40 between adjacent rolling elements R and a pair of annular retainers 42, press fitted in undercuts in the inner ring assembly.

Considering now more specifically the structural details and arrangement of a bearing assembly in accordance with the present invention, each of the rolling elements R comprises a generally cylindrical center segment $R_c$ and spherical end segments $R_e$. The outer ring 14 has a circumferentially extending raceway 50 comprised of a cylindrical axial center section 50a and arcuate end sections 50b conforming in contour to and engageable by the portions of the spherical end segments $R_e$ of the rolling elements which the arcuate end sections 50b of the raceway confront. In accordance with the embodiment illustrated in FIG. 2, the ring segment 12a has a cylindrical axial center surface 60a and an arcuate end raceway section 60b at one end of the axial surface 60a. The ring segment 12b has an arcuate end raceway section 60c defining the opposite end of the inner raceway. The arcuate raceway sections 60b and 60c confront and engage the spherical ends of the rolling elements thereby providing nominal point contact during operation of the bearing, whereas the axial surface 60a is spaced from and out of contact with the cylindrical segment $R_c$ of the rolling elements which it confronts, providing a clearance C. By this arrangement, the rolling elements rotate about a fixed axis A—A and the contact angle $\alpha$ remains substantially constant. The contact angle is preferably in the range of between 35° and 50°. This has the effect of spreading spin friction equally between the race contacts at the arcuate raceway section and external thrust load is carried by rolling/spinning contacts at fixed contact angles so that the rolling elements are in force balance. Note that external thrust load can be accommodated in either direction and pass through zero. Further, in this manner, centrifugal loading, which may be the dominant force in the bearing at high speeds, is supported by a high capacity line contact between the rolling elements and outer ring raceway.

Even though the arcuate raceway sections in the illustrated embodiment are spherical in cross section, it is to be understood that these raceway sections may be of another geometric configuration, for example, conical. In this event, the rolling elements may be provided with complementary conical end segments or spherical end segments having a large radius.

Figure 3:
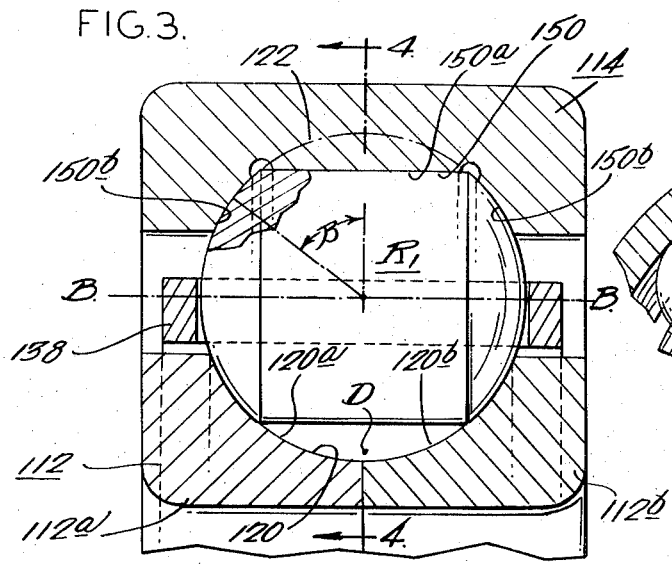
FIG. 3 is a sectional view of a modified form of bearing assembly constructed in accordance with the present invention.
Figure 4:
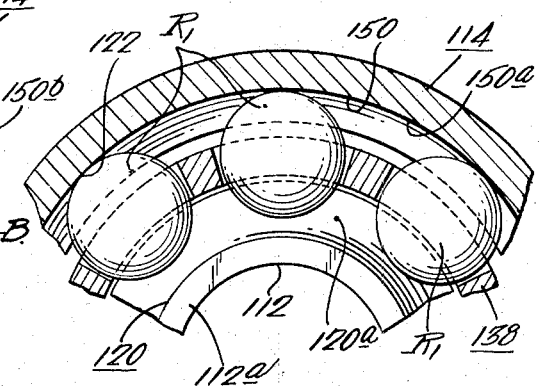
FIG. 4 is a fragmentary sectional view taken on lines 4—4 of FIG. 3.

There is illustrated in FIG. 3 a modified form of bearing assembly in accordance with the present invention. The assembly comprises inner and outer rings, 112 and 114, spaced apart to define an annular space for a plurality of rolling elements $R_1$ and a cage 138 for circumferentially spacing the rolling elements. In the present case, the rolling element $R_1$ and outer ring 114 are identical to the rolling elements and outer ring of the previously described embodiment and thus the parts thereof have been numbered similarly except in the one hundred series.

The inner ring assembly 112 comprises two ring members 112a and 112b, of identical configuration. Each ring member has an arcuate surface 120a and 120b of a contour conforming to the curvature of the spherical end segments of the rolling elements, thereby providing an annular clearance D between the axial portion of the rolling elements and the inner surface in the central region. The outer portions of the surfaces 120a and 120b define axially spaced apart inner raceway sections. In this embodiment, the contact angle $\alpha$ is large, preferably in the range of between 35° and 50°.

This bearing functions in the same manner as the previously described embodiment providing optimum functional advantages in the ultra high speed applications. Thus, the rolling elements $R_1$ rotate about a fixed axis B—B and the contact angle $\alpha$ remains substantially fixed irrespective of load direction or variations. Note that the rolling elements maintain line contact with the outer raceway ring and are spaced along their cylindrical center section from the central portion of the inner ring surface between the raceway sections.

There is illustrated in FIGS. 5–7, inclusive, another embodiment of rolling bearing assembly in accordance with the present invention which is particularly suited for use in ultra high speed applications. The bearing assembly which is generally designated by the numeral 300 is shown mounted on a typical jet engine main shaft assembly. The bearing 300 comprises an inner ring assembly 312 mounted on the hub portion 316 of the engine main shaft and an outer ring 314 supported in the housing 318. The inner ring assembly is fixed against axial displacement by a spacer 320 and lock nut 322 at one end and a slip plate 330 which bears against a peripheral shoulder 332 on the hub 316.

The outer ring 314 is substantially identical to the outer ring of the previously described embodiments and thus the raceway 315 includes a generally cylindrical center section 315a and arcuate end sections 315b which in the present instance are of spherical contour. It is noted that the end sections may be of other geometric shapes such as conical. There is provided a circumferential relief groove 317 at the juncture of the center section and the arcuate end sections.

Each of the rolling elements 336 comprises a generally cylindrical center segment 336a and spherical end segments 336b in the present instance in the form of a spherical zone by reason of the axial bore 338 which extends through the rolling element to further reduce mass. It is noted that the spherical zone 336b in the present instance is centered at the geometric center of the rolling element, that is if the trace of the zone were completed, it would form a true sphere (see broken lines). If, however, the arcuate sections of the inner and outer raceways were made conical, then the zone 336b should have a much larger radius and be toroidal in nature.

The inner ring assembly 312 comprises a pair of ring members 312a and 312b having axially spaced arcuate raceway sections 360a and 360b which confront and engage the arcuate end sections of the rolling elements.

Each ring member is cut away to define a circumferential channel 364 depending from the arcuate raceway sections and providing a pocket for a cage 370.

The cage 370 includes a ring-like body portion 372 of generally rectangular cross section and closely conforming to the channel 364 and radially outwardly projecting tangs 374 circumferentially spaced apart and having a circular contour to define pockets for the rolling elements. Note that the tangs 374 have a greater axial dimension than the cylindrical portion of the rolling elements to achieve optimum roller guidance.

The inner bearing assembly 312 incorporates means facilitating effective lubrication of the bearing. To this end, the confronting faces of the ring members 312a and 312b are chamfered to define a pair of radially spaced circumferentially extending lubrication channels 380 and 382 connected by a plurality of connecting passages 384 which extend obliquely between confronting faces of the ring members. The inner channel 380 is aligned with and communicates with a supply groove 390 on the hub which in turn is connected to a suitable source of lubricant through radial port 392.

This novel cage arrangement described provides many functional advantages in a bearing for ultra high speed applications.

For example, lubrication of the bearing is greatly improved. The absence of outside cage bars facilitates ingress of cooling oil from jets oriented to direct lubricant in the area of the axial ends of the bearing and can be directed in a manner to insure inner and outer ring contact. The central lubricant system provides lubrication of the cage guide bore and side guide surfaces, the radial drillings to each roller pocket providing centrifugally presssurized lubricant to the surfaces defining the pockets for the rolling elements. The cage can be bore guided and the single land surface of the body portion can be more than double the sum of normal land widths of conventional cages whereby land bearing lubrication is much improved.

In the cage of the present invention, the mass of the cage is well within the pitch circle of the rolling elements so that the moment of inertia of the cage is reduced substantially. The differential sliding velocity at the bore land surface will be less than for a conventionally guided cage, and thus cage drag forces will be reduced.

The cage of the present invention may be on one piece construction wherein the rolling element pockets are formed by a simple straight through milling operation thereby providing a simplified assembly which is easy and economical to manufacture. Alternatively, the body portion and tangs can be separate elements. The cage tangs can be of small cross section thereby permitting a greater number of rolling elements in the bearing complement thereby to increase the capacity of the assembly considerably. The cage of the present invention does not depend for guidance on the land surfaces conventionally located axially outboard of the raceway, and thus the overall mass of the entire assembly may be reduced and the axial dimension of the rings maintained at a minimum without sacrificing capacity, thus conserving mass and space, important design considerations in ultra high speed applications. The term "line contact" as used herein to define the contact between the rolling elements and the outer raceway and the term "nominal point contact" defining the contact between the rolling elements and the inner raceway sections describe the contact between the rolling elements and the raceway in the static state, that is, under no operating loads. Under operating loads, the "line contact" becomes a generally rectangular contact area due to normal elastic deformation of the parts and the "nominal point contact" area becomes a generally elliptical contact area for the same reason. It is noted that the axial end portions of the rolling elements are not in strict conformity with the inner raceway sections and in the illustrated embodiments are of a slightly different radii, the degree of osculation being within conventional standard ranges. More specifically and with respect to the embodiment of FIG. 2, the arcuate inner raceway sections are of a slightly larger radius than the spherical ends of the rolling element.

What is claimed is:

1. A rolling bearing assembly comprising inner and outer rings spaced apart to define an annular space, said rings having inner and outer raceways, a plurality of rolling elements in the annular space between said rings, said rolling elements having a central portion defined by a substantially linear surface of revolution and axial end face portions of predetermined configuration, said raceways being of a predetermined configuration providing for rotation of each of the rolling elements about a fixed axis and having a substantially fixed contact angle with the outer ring, said rolling elements during operation of the bearing when it is under a predetermined dynamic load being in line contact area with the outer raceway and engageable with axially spaced inner raceway sections and in nominal point contact therewith, the central portion of said rolling elements being spaced from the surface of said inner ring between said inner raceway sections.

2. A rolling bearing assembly as claimed in Claim 1 wherein the central portion of said rolling elements is cylindrical and the axial end face portions are spherical and wherein said outer raceway comprises a generally cylindrical circumferentially extending center section and arcuate end sections conforming generally to the contour of the rolling element and wherein the spherical end segments of the rolling elements are engageable with said inner raceway sections.

3. A rolling bearing assembly as claimed in claim 1 wherein each of said rolling elements has an axial bore extending therethrough and wherein the outer surface of each of said rolling elements comprises a cylindrical center segment and end faces in the form of a spherical zone.

4. A rolling bearing assembly as claimed in claim 1 wherein the contact angle is preferably in the range between about 35° and 50°.

5. A rolling bearing assembly as claimed in claim 1 including a needle roller between adjacent ones of the rolling elements to circumferentially space the same and retainers at opposite axial ends of the inner ring assembly for limiting axial movement of the needle rollers.

6. A rolling bearing assembly as claimed in claim 1 wherein the surface of said inner ring between said inner raceway sections is spherical.

7. A rolling bearing assembly as claimed in claim 1 wherein the axial dimension of each of said tangs is greater than the axial dimension of said body portion to provide better guidance for the roller elements.

8. A rolling bearing assembly as claimed in claim 1 wherein said inner ring comprises two ring members and including a plurality of circumferentially spaced lubricant passages between the confronting inner axial end faces of the ring members communicating at their inner ends with a circumferential groove in said channel.

9. A rolling bearing assembly as claimed in claim 9 wherein said lubricant passages extend obliquely between the confronting faces of the ring members.

10. A rolling bearing assembly as claimed in claim 1 wherein said inner raceway sections are conical and the axial end face portions of said rolling elements engageable with said inner raceway sections are spherical.

11. A rolling bearing assembly as claimed in claim 1 including means defining a circumferential channel in the inner ring between the raceway sections, a cage for circumferentially spacing and guiding said rolling elements including an annular body portion engaging in said channel and a plurality of tangs projecting radially outwardly from said body portion circumferentially spaced to define pockets for the rolling elements.

* * * * *